H. W. GOODALL.
METAL LINED HOSE.
APPLICATION FILED AUG. 31, 1920.

1,385,821.  Patented July 26, 1921.

WITNESS:

INVENTOR
Howard W. Goodall
BY
ATTORNEY.

UNITED STATES PATENT OFFICE.

HOWARD W. GOODALL, OF ALDAN, PENNSYLVANIA.

METAL-LINED HOSE.

1,385,821.  Specification of Letters Patent.  Patented July 26, 1921.

Application filed August 31, 1920. Serial No. 407,080.

*To all whom it may concern:*

Be it known that I, HOWARD W. GOODALL, a citizen of the United States, residing at Aldan, in the county of Delaware and State of Pennsylvania, have invented a new and useful Metal-Lined Hose, of which the following is a specification.

The principal objects of the present invention are, first, to provide a metal lined hose which can be made in long lengths each having the metal lining co-extensive with the outer part and which may be initially cut and fitted with couplings, or repaired, if worn near the couplings, by cutting out the worn part and refitting the coupling, and second, to provide a hose adapted to withstand suction, and also especially applicable for use in connection with oil, gasolene and other substances that attack rubber.

The invention will be first described and afterward pointed out in the claims and in giving this description reference will be made to the accompanying drawings forming part hereof and in which—

Figure 1:
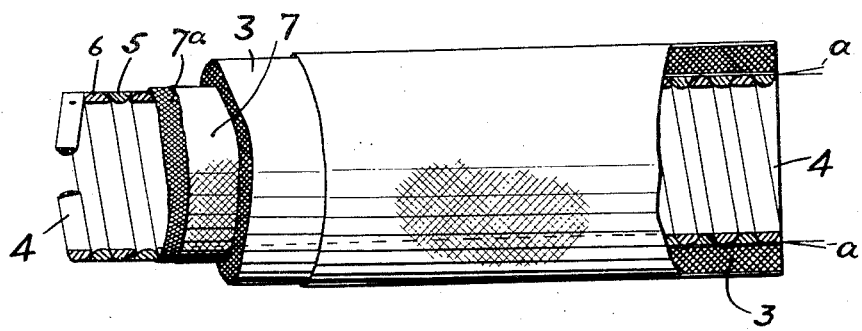
Figure 2:
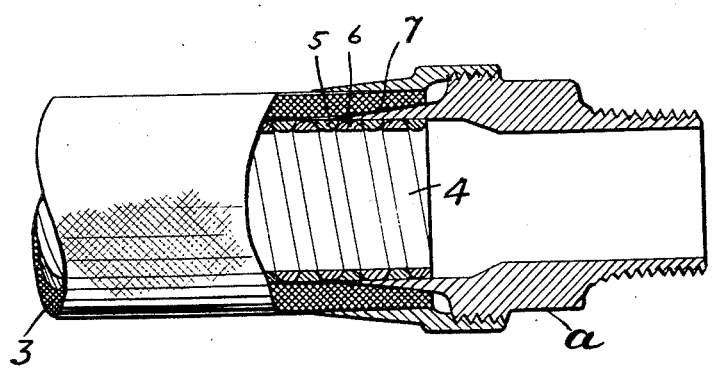

Figure 1, is a side view, partly in section, with parts broken away of hose embodying features of the invention, and Fig. 2, is a similar view illustrating some of the advantages of the invention.

In the drawings the tube 3, is of any suitable material used for hose, for example, rubber and duck, or of layers of duck and rubber, or both. The metallic lining 4, consists of substantially half round wires, in pairs, disposed one 5, with its flat face, and the other 6, with its round face, toward the surface of the bore of the tube 3, said round and flat faces being flush and each in contact with the surface of the bore of the tube 3, and each arranged in the form of a spiral having a pitch substantially equal to the width of the flat face of the other. This metallic lining 4, is co-extensive with the tube 3, so that the hose can be made in long lengths and cut to suit any requirements. This is practically possible because an externally beveled coupling sleeve *a*, Fig. 2, can be inserted between the tube 3, and the lining 4, due to the peculiar structure of the latter. The peculiar structure of the lining also tends to keep oil, gasolene and like fluids, which would attack the rubber part 3, from reaching it, and it also supports the rubber wall even if weakened by the action of such fluids or if subjected to the action of suction, and the accomplishment of these results is promoted by reason of the fact that the lining and tube are co-extensive. In its adaptability to the application of the described coupling member, the construction of the lining is important, because it provides the same internal diameter through the hose and coupling. Hose usually fails or wears near the coupling member and since the described hose can receive the coupling member *a*, between its outer or rubber part 3, and its metal lining 4, by reason of the peculiar construction of the latter, it follows that the worn part can be cut out and the coupling re-applied. 7, is a layer of canvas or the like arranged between the metallic lining 4, and the tube 3, and when present it facilitates the accomplishment of the described results. 7ª, is a braiding of relatively fine wire which when present as in Fig. 1, but not in Fig. 2, holds the metallic lining 4, in shape and also affords a rough gripping surface between it and the canvas 7. The described hose is very flexible and durable and its durability is increased by reason of the fact that the metal lining extends to the coupling and into one of its elements.

I claim:

1. Metal lined hose in which the outer rubber and the metal lining parts are co-extensive and which is adapted to receive a tapering coupling sleeve between its outer rubber and metal lining parts of which the latter comprises a pair of substantially half round wires disposed one with its flat face and the other with its round face toward the inner surface of the outer rubber part, said round and flat faces being flush and in contact with said inner surface and each arranged in the form of a spiral having a pitch substantially equal to the width of the flat face of the other, substantially as described.

2. Metal lined hose in which the outer rubber and the metal lining parts are co-extensive and are provided between them with a textile layer and which is adapted to receive a coupling sleeve between the textile layer and the metal lining which comprises a pair of substantially half round wires disposed one with its flat face and the other with its round face toward the inner surface of the textile layer, said round and flat faces being flush, and in contact with said inner surface and each arranged in the form of a spiral having a pitch substantially equal to the width of the flat face of the other, substantially as described.

3. Metal lined hose comprising an outer tube of rubber material, and a lining coterminal with the tube and consisting of spirally arranged substantially half round wires disposed in contact and one with its flat face and the other with its round face in the same cylindrical plane and toward the inner surface of the tube and providing a union between the parts which can be readily separated for the reception of a coupling sleeve, substantially as described.

4. Metal lined hose in which the outer rubber and the metal lining parts are coextensive and are provided between them and with a layer of wire braiding and textile and which is adapted to receive a coupling sleeve between the layer of wire braiding and textile and the metal lining which comprises a pair of substantially half round wires disposed one with its flat face and the other with its round face toward the inner surface of the layer of wire braiding and textile, said round and flat faces being flush and in contact with said inner surface and each arranged in the form of a spiral having a pitch substantially equal to the width of the flat face of the other, substantially as described.

5. Metal lined hose in which the outer rubber and the metal lining parts are co-extensive and are provided between them with a layer and which is adapted to receive a coupling sleeve between the layer and the metal lining which comprises a pair of substantially half round wires disposed one with its flat face and the other with its round face toward the inner surface of the layer, said round and flat faces being flush and in contact with said inner surface and each arranged in the form of a spiral having a pitch substantially equal to the width of the flat face of the other, substantially as described.

HOWARD W. GOODALL.